(12) United States Patent
Kohira et al.

(10) Patent No.: US 8,116,037 B2
(45) Date of Patent: Feb. 14, 2012

(54) DISK DRIVE INCLUDING HEAD-SLIDER CONFIGURED TO SUPPRESS LUBRICANT DROPLET ACCUMULATION

(75) Inventors: Hidekazu Kohira, Kanagawa (JP);
 Kiyoshi Hashimoto, Kanagawa (JP);
 Satoru Ookubo, Kanagawa (JP);
 Jianhua Li, Kanagawa (JP); Junguo Xu, Ibaraki (JP); Yuichi Aoki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/634,660

(22) Filed: Dec. 9, 2009

(65) Prior Publication Data

US 2011/0058275 A1 Mar. 10, 2011

(30) Foreign Application Priority Data

Dec. 9, 2008 (JP) ................................. 2008-313375

(51) Int. Cl.
 *G11B 5/60* (2006.01)
(52) U.S. Cl. ................ 360/235.7; 360/236.2; 360/236.3
(58) Field of Classification Search ............... 360/235.7, 360/235.8, 236.1, 236.2, 236.3, 236.5, 236.6, 360/236.8, 236.9, 237
See application file for complete search history.

(56) References Cited

U.S. PATENT DOCUMENTS

| | | | | |
|---|---|---|---|---|
| 6,525,909 B1* | 2/2003 | Qian et al. | ................. | 360/235.7 |
| 7,515,384 B2* | 4/2009 | Huang | ........................ | 360/235.6 |
| 7,679,863 B2* | 3/2010 | Hashimoto et al. | ........ | 360/235.7 |
| 2004/0120075 A1* | 6/2004 | Rajakumar | ................ | 360/235.8 |
| 2005/0036241 A1* | 2/2005 | Tsuda et al. | ................... | 360/264 |

FOREIGN PATENT DOCUMENTS

| | | |
|---|---|---|
| JP | 2002133631 | 5/2002 |
| JP | 2005018985 | 1/2005 |

\* cited by examiner

*Primary Examiner* — Jefferson Evans

(57) ABSTRACT

A disk drive. The disk drive includes a disk and a head-slider. The head-slider includes an air-bearing surface. The air-bearing surface includes a trailing-edge rail surface, an inner trailing-edge pad, and an outer trailing-edge pad. The pad surface of the outer trailing-edge pad includes a straight outer edge slanting outward; and, the angle of the outer edge with respect to the longitudinal direction of the head-slider is $\beta_1$. The pad surface of the inner trailing-edge pad includes a straight inner edge slanting inward; and, the angle of the inner edge with respect to the longitudinal direction of the head-slider is $\beta_2$. For absolute values of skew angles at an outermost data track position and an innermost data track position on the disk that are denoted by $\alpha_1$ and $\alpha_2$, respectively, the following conditions are satisfied:

$$\alpha_2 \leq \beta_1, \alpha_1 + \beta_1 \leq 90°, \text{ and } \alpha_1 \leq \beta_2, \alpha_2 + \beta_2 \leq 90°.$$

13 Claims, 12 Drawing Sheets

(A)

(B)

(C)

(A)

(B)

(A)

(B)

(A)

(B)

(A)

(B)

DISK DRIVE INCLUDING HEAD-SLIDER CONFIGURED TO SUPPRESS LUBRICANT DROPLET ACCUMULATION

CROSS-REFERENCE TO RELATED APPLICATION

This application claims priority from the Japanese Patent Application No. 2008-313375, filed Dec. 9, 2008, the disclosure of which is incorporated herein in its entirety by reference.

TECHNICAL FIELD

Embodiments of the present invention relate to a disk drive that includes a head-slider configured to suppress lubricant droplet formation.

BACKGROUND

A hard disk drive (HDD) used as an information-storage device includes a magnetic-recording head including a read element and a write element. A write element of the magnetic-recording head writes data to, or alternatively, erases data from, data bits arranged on a circular track of a magnetic-recording disk, which includes an information-storage medium. The read element reads a magnetic signal recorded by the write element. The magnetic-recording head is disposed in a head-slider body forming the head-slider. The head-slider is mounted on a suspension arm. The suspension arm applies a compressive force to the head-slider in a direction of the magnetic-recording disk. When the magnetic-recording disk is rotated, the head-slider flies on a film of air formed on the recording surface of the magnetic-recording disk caused by rotation of the magnetic-recording disk.

The surface of the magnetic-recording disk includes a protective layer, which is covered with a lubricating film, for preventing the magnetic-recording head from getting worn and corroded. In order to reduce the spacing between the magnetic-recording head and the magnetic recording layer, also referred to herein by the term of art, "fly height," for increasing magnetic recording area density, the lubricating film is decreased in thickness of a monomolecular layer. The monomolecular layer of lubricant is kept at the interface between the head-slider and the magnetic-recording disk in order to maintain the reliability at the interface between the head-slider and the magnetic-recording disk. Mobility is an intrinsic property of the lubricant; the lubricant is sufficiently immobile so as not to be easily displaced by slider-disk contact, but is mobile enough so that any lubricant lost from the lubricant residing in the lubricating film can be easily replenished.

The head-slider includes an air-bearing surface (ABS) facing the magnetic-recording disk. While the magnetic-recording disk is being rotated, the magnetic-recording disk drags air under the head-slider along the ABS in a direction approximately parallel to the tangential velocity of the magnetic-recording disk. As the air passes beneath the ABS, the air is compressed to increase the pressure between the disk surface and the ABS of the head-slider, which creates a hydrodynamic lifting force, which is referred to by the term of art, "lift," that counteracts the compressive force to lift the head-slider, allowing the head-slider to fly in proximity with the recording surface of the magnetic-recording disk.

Once the HDD is operated, four kinds of forces: hydrodynamic force, Van der Waals' force, electrostatic force, and air shearing stress may cause the lubricating film to move. Among the four kinds of forces, the air shearing stress is the dominant one for the movement of the lubricant. Since the air shearing stress moves the lubricant to the underside of the head-slider, droplets of the lubricant are formed on the surface of the head-slider that faces the magnetic-recording disk.

For a head-slider having an extremely low fly height, an extremely strong relationship exists between the motion of the lubricant droplets and the airflow on the underside of the head-slider. Most of the lubricant droplets are moved to the trailing edge of the head-slider by the air shearing stress. These forces and the effects of these forces on lubricant mobility and distribution are of interest to engineers and scientists engaged in HDD manufacturing and development who seek to meet the rising demands of the marketplace for increased data-storage capacity, performance, and reliability.

SUMMARY

Embodiments of the present invention include a disk drive. The disk drive includes a disk configured to rotate, and a head-slider configured to fly in proximity with a recording surface of the disk. The head-slider includes an air-bearing surface configured to face the disk. The air-bearing surface includes: a trailing-edge rail surface in which a magnetic-recording head is disposed; an inner negative-pressure recessed surface formed at an inner diameter side of the trailing-edge rail surface; an outer negative-pressure recessed surface formed at an outer diameter side of the trailing-edge rail surface; an inner trailing-edge pad that is disposed between the trailing-edge rail surface and the inner negative-pressure recessed surface; and, an outer trailing-edge pad that is disposed between the trailing-edge rail surface and the outer negative-pressure recessed surface. The magnetic-recording head includes a read element configured to read data from the disk, and a write element configured to write data to the disk. The inner trailing-edge pad includes a pad face deeper than the trailing-edge rail surface and shallower than the inner negative-pressure recessed surface. The outer trailing-edge pad includes a pad face deeper than the trailing-edge rail surface and shallower than the outer negative-pressure recessed surface. The pad surface of the outer trailing-edge pad further includes a straight outer edge slanting outward in the direction from an inflow side toward an outflow side; and, the angle of the outer edge with respect to the longitudinal direction of the head-slider is $\beta_1$. The pad surface of the inner trailing-edge pad further includes a straight inner edge slanting inward in the direction from an inflow side toward an outflow side; and, the angle of the inner edge with respect to the longitudinal direction of the head-slider is $\beta_2$. For absolute values of skew angles at an outermost data track position and an innermost data track position on the disk that are denoted by $\alpha_1$ and $\alpha_2$, respectively, the following conditions are satisfied:

$$\alpha_2 \leq \beta_1, \alpha_1 + \beta_1 \leq 90°, \text{ and } \alpha_1 \leq \beta_2, \alpha_2 + \beta_2 \leq 90°.$$

As described above and elsewhere described herein, the angles $\alpha_1$, $\alpha_2$, $\beta_1$, and $\beta_2$ refer to the positive definite magnitudes, which are the absolute values, of the angles described.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
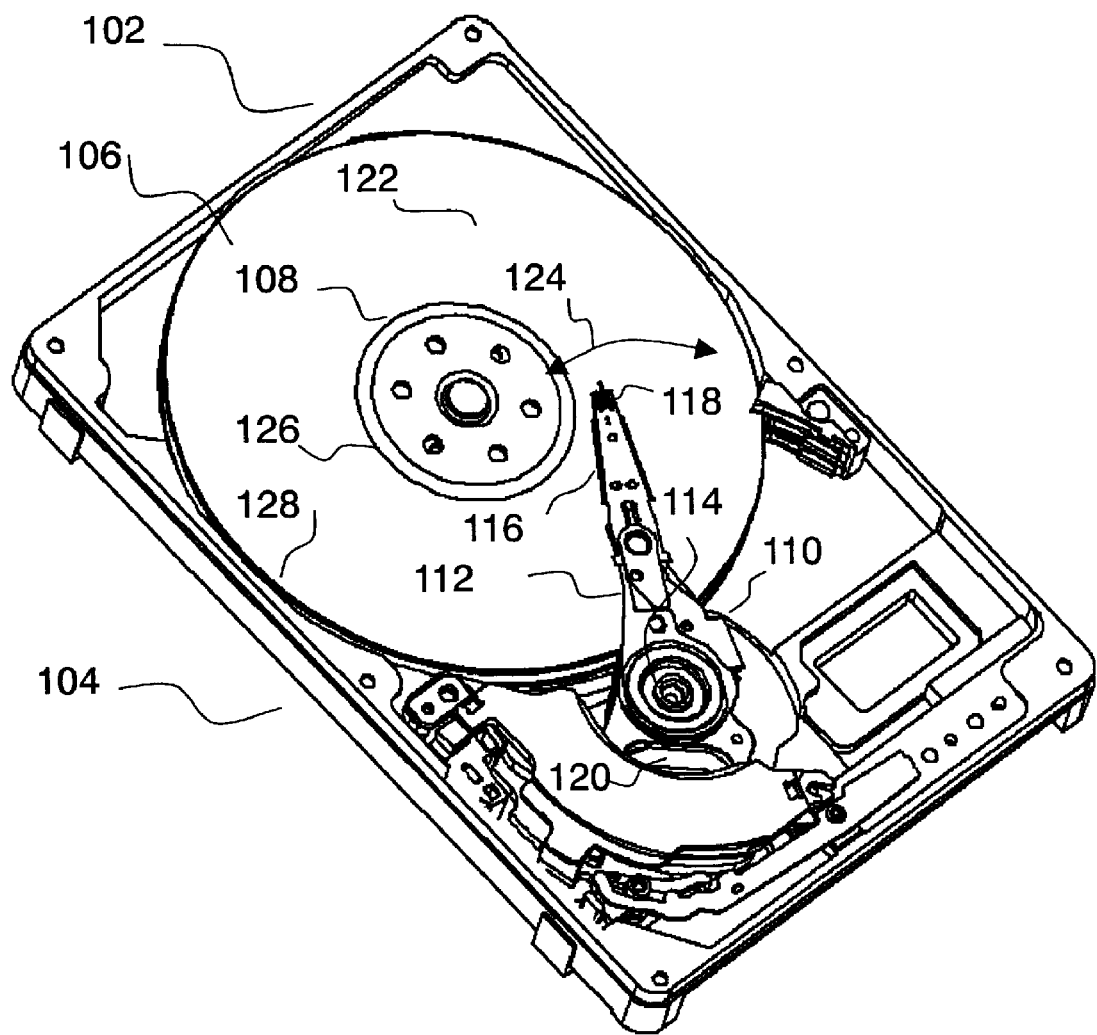
FIG. 1 is an example schematic diagram of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive Including a Head-Slider Configured to Suppress Lubricant Droplet Accumulation With relevance to embodiments of the present invention, to achieve low and stable flight, a head-slider is known in the art that has an air-bearing surface (ABS) having a special shape that faces a magnetic-recording disk. As HDD technology advances, the average fly height of head-sliders is continuously decreased, so that lubricant droplets are likely to be accumulated on the ABS of a head-slider, and contact, or falling, of the deposited lubricant onto the magnetic-recording disk may cause a read error, or a write error. Nevertheless, low-flying head-sliders have been used without taking into consideration such accumulation of the lubricant in the vicinity of a read element, or a write element. When the lubricant accumulated on the read element, or the write element, of the head-slider contacts, or falls onto, the magnetic-recording disk, a read error or a write error may occur as described above. Moreover, if a write error occurs, data may be irreparably lost.

As is also known in the art, fly-height adjustment technology has been adopted in hard disk drives, wherein the fly height of a head-slider in a proximate contact state is increased by a designated amount by means of thermal fly-height control (TFC). In a contact test during manufacturing, contact between the lubricant and the slider surface occurs, which causes lubricant accumulation on the slider surface. Furthermore, the lubricant accumulation on the slider surface changes the relationship of the fly-height variation and the heater power variation for the TFC, so that TFC pull-back technology has little effect.

In order not to obviate the effect of pull-back technology by avoiding lubricant accumulation on a stepped portion at a trailing edge, which gradually grows into a large droplet and eventually contacts, or falls onto, the surface of the magnetic-recording disk, a head-slider is known in the art for which an intermediate step has been disposed on both sides of a trailing-edge rail surface to increase the angle of the stepped portion so that lubricant accumulation may be localized at the intermediate step to decrease the amount of lubricant accumulated.

The thickness of the lubricating film is currently decreased to an atom level for a small magnetic spacing between the read element, or the write element, of the head-slider and the magnetic-recording layer in order to increase the magnetic recording density. Moreover, the fly height of the head-slider is also reduced in order to achieve a small magnetic spacing. With the demands for increased recording density, the magnetic spacing has been so reduced that the pressure on the read element and the write element has been increased; and, as a result, droplets of the lubricant are frequently formed by evaporation and condensation, or contact, which easily accumulate on the read element, or the write element, due to a backflow from the trailing edge of the head-slider.

With reference now to FIGS. 5(A) and 5(B), in accordance with the conventional art, airflows are shown over the ABS of a conventional head-slider 502 when the head-slider 502 flies in proximity with the recording surface of the magnetic-recording disk at an inner diameter area of the magnetic-recording disk. As described herein, the right side of each drawing of a head-slider is the leading-edge side, which may be referred to alternatively as the inflow side, and the left side of each drawing of a head-slider is the trailing edge side, which may be referred to alternatively as the outflow side. In the vicinity of the head-slider surface, reverse flows 508 and 510 from a trailing-edge side occur near the both sides of a trailing-edge rail.

Stagnation lines 504 and 506 are formed, where the generated airflow has a velocity of zero in the lengthwise direction of the head-slider due to the reverse flows. Thus, in accordance with the conventional art, the flow rate near a center rail having the magnetic-recording head is decreased. Furthermore, the stagnation line 504, which has a flow toward the trailing-edge rail, is connected to the trailing-edge rail, and the droplets of the lubricant are led to the trailing-edge rail along the stagnation line 504. Therefore, the lubricant usually accumulates at the corner on the trailing-edge rail.

With reference now to FIGS. 6(A) and 6(B), airflows are shown over the ABS of a conventional head-slider 602 when the head-slider 602 flies in proximity with the recording surface of the magnetic-recording disk at an outer diameter area of the magnetic-recording disk. In the vicinity of the head-slider surface, reverse flows 608 and 610 from a trailing edge occur near the both sides of the trailing-edge rail.

Stagnation lines 604 and 606 are formed, where the generated flow has a velocity of zero in the lengthwise direction of the head-slider due to the reverse flows. Thus, in accordance with the conventional art, the flow rate near the center rail having the magnetic-recording head is decreased. Furthermore, the stagnation line 606, which has a flow toward the trailing-edge rail, is connected to the trailing-edge rail, and the droplets of the lubricant are led to the trailing-edge rail along the connection line. Therefore, the lubricant usually accumulates at the corner on the trailing-edge rail.

To avoid contact of the trailing edge of the head-slider when the magnetic spacing is reduced, most head-sliders are designed to have a narrow trailing-edge rail and a wider recessed surface in each of both sides of the trailing-edge rail. When a heater for TFC is disposed in a magnetic-recording head to thermally expand the surround of a read element, or write element, so as to protrude from the ABS, the rail is often disposed in such a manner to avoid reaching the trailing edge of the head-slider to prevent contact of the expanded ABS of the rail with the magnetic-recording disk.

In this way, when a rail portion is disposed in such a manner to avoid reaching the trailing edge of the head-slider, the reverse flows 508, 510, 608, and 610 from the trailing edge occur even at a wake side from the rail portion where the read element and the write element are disposed. Droplets of the lubricant are led to the trailing-edge rail by the reverse flow 508 or 608. Moreover, the reverse flows 610 and 510 flow along the trailing edge of the trailing-edge rail, and the droplets led by the reverse flow 508 or 608 are accumulated on a corner of the trailing-edge rail. When the accumulated droplets fall from the end of the trailing-edge rail, oscillation occurs in the head-slider, leading to an error during writing data to, or reading data from, the magnetic-recording disk.

To increase the recording density without reducing the reliability of a HDD, the fly height of the head-slider is decreased, and control is performed to suppress the accumulation of lubricant droplets on the trailing edge of the read element, or the write element, of the head-slider due to the backflows from the trailing edge of the head-slider. The low altitude sensitivity means that the ABS of the head-slider has less fly-height loss at a higher altitude, for example, such as 3000 meters, compared to fly-height loss at sea level. The condition for lessened fly-height loss becomes more of an issue for disk drives with sub-10 nanometer fly height.

Embodiments of the present invention provide a head-slider on which lubricant droplets are not accumulated, or minimally accumulated, on a rail pad having a magnetic-recording head, so that falling of the droplets onto a disk is suppressed, leading to increased reliability of the disk drive.

In accordance with embodiments of the present invention, a disk drive includes a disk configured to rotate and a head-slider configured to fly in proximity with a recording surface of the disk. In accordance with embodiments of the present invention, the head-slider includes an ABS configured to face the disk; the ABS includes: an trailing-edge rail surface in which a magnetic-recording head is disposed, the magnetic-recording head including a read element configured to read data from the disk and a write element configured to write data to the disk; an inner negative-pressure recessed surface formed at an inner diameter side of the trailing-edge rail surface; an outer negative-pressure recessed surface formed at an outer diameter side of the trailing-edge rail surface; an inner trailing-edge pad that is disposed between the trailing-edge rail surface and the inner negative-pressure recessed surface and includes a pad face deeper than the trailing-edge rail surface and shallower than the inner negative-pressure recessed surface; and an outer trailing-edge pad that is disposed between the trailing-edge rail surface and the outer negative-pressure recessed surface and includes a pad face deeper than the trailing-edge rail surface and shallower than the outer negative-pressure recessed surface. In accordance with embodiments of the present invention, the pad face of the outer trailing-edge pad includes a straight outer edge slanting outward in the direction from a leading-edge side toward a trailing-edge side; and, the angle of the outer edge with respect to the longitudinal direction of the head-slider is $\beta_1$. In accordance with embodiments of the present invention, the pad face of the inner trailing-edge pad includes a straight inner edge slanting inward in the direction from a leading-edge side toward a trailing-edge side; and, the angle of the inner edge with respect to the longitudinal direction of the head-slider is $\beta_2$. In accordance with embodiments of the present invention, for absolute values of skew angles at an outermost data track position and an innermost data track position on the disk that are denoted by $\alpha_1$ and $\alpha_2$, respectively, the following conditions are satisfied: $\alpha_2 \leq \beta_1$, $\alpha_1 + \beta_1 \leq 90°$, and $\alpha_1 \leq \beta_2$, $\alpha_2 + \beta_2 \leq 90°$.

As described above and elsewhere described herein, the angles $\alpha_1$, $\alpha_2$, $\beta_1$, and $\beta_2$ refer to the positive definite magnitudes, which are the absolute values, of the angles described. Thus, in accordance with embodiments of the present invention, these two trailing-edge pads may suppress fly-height loss caused by accumulated droplets of lubricant on the ABS due to backflows of air.

In an embodiment of the present invention, the angle, $\beta_1$, and the angle, $\beta_2$, are equal in magnitude; and, the pad face of the inner trailing-edge pad and the pad face of the outer trailing-edge pad are disposed at the same depth. Thus, in an embodiment of the present invention, a highly reliable head-slider may be fabricated through simple design and manufacturing.

In another embodiment of the present invention, the angle, $\beta_1$, and the angle, $\beta_2$, satisfy the following conditions: $\beta_1 \leq 35°$, and $\beta_2 \leq 35°$. Thus, in an embodiment of the present invention, fly-height loss at high altitude may be effectively suppressed.

In an embodiment of the present invention, a length of the inner trailing-edge pad in the longitudinal direction of the head-slider is not less than twice a length from the trailing edge of the head-slider to a leading edge, which is an inflow side, of the magnetic-recording head; and, a length of the outer trailing-edge pad in the longitudinal direction of the head-slider is not less than twice the length from the trailing edge of the head-slider to a leading edge, which is an inflow side, of the magnetic-recording head. Thus, in an embodiment of the present invention, backflow from the trailing edge may be effectively prevented.

In another embodiment of the present invention, the ABS further includes a step surface deeper than the trailing-edge rail surface at an inflow side of the trailing-edge rail surface. Thus, in accordance with embodiments of the present invention, a suitable flying pressure for the head-slider may be obtained. Moreover, in another embodiment of the present invention, the pad surface of the inner trailing-edge pad and the pad surface of the outer trailing-edge pad are disposed at the same depth that is equal to a depth of the step surface. Thus, in an embodiment of the present invention, a highly reliable head-slider may be fabricated through simple design and manufacturing.

In an embodiment of the present invention, the depths of the inner trailing-edge pad and the outer trailing-edge pad are 0.3 μm or less. Thus, in an embodiment of the present invention, backflows of air at the trailing edge may be suppressed to prevent adhesion of lubricant droplets.

In another embodiment of the present invention, the ABS further includes two side rail surfaces. Moreover, in an embodiment of the present invention, each inflow side of the two side rail surfaces is formed with a U-shape. Thus, in an embodiment of the present invention, a flying pressure suitable for the head-slider may be obtained. In another embodiment of the present invention, the ABS further includes a step surface deeper than the trailing-edge rail surface and shallower than the inner and outer negative-pressure recessed surfaces at an inflow side of the trailing-edge rail surface; and, the ABS further includes a protrusion protruding from an inflow side of the trailing-edge rail surface for dividing the step surface. Thus, in an embodiment of the present invention, a flying pressure suitable for the head-slider may be obtained.

In another embodiment of the present invention, the ABS further includes a step surface deeper than the trailing-edge rail surface and shallower than the inner and outer negative-pressure recessed surfaces at an inflow side of the trailing-edge rail surface; and, a width of the trailing-edge rail surface at the trailing edge is less than a width of the step surface at the trailing edge of the step surface. Thus, in an embodiment of the present invention, a flying pressure suitable for the head-slider may be obtained. In another embodiment of the present invention, the ABS further includes a center channel and a plurality of side channels that are deeper than the negative-pressure recessed surface. Moreover, in another embodiment of the present invention, at least one of the pluralities of side channels is open to the center channel. Thus, in an embodiment of the present invention, a flying pressure suitable for the head-slider may be obtained.

Embodiments of the present invention provide a head-slider which suppresses a fly-height loss caused by accumulation of droplets of lubricant on the ABS due to backflows of air, so that the reliability of a disk drive may be increased. Embodiments of the present invention are subsequently described, by way of example without limitation thereto, in the environment of a HDD, as an example of a disk drive.

With reference now to FIG. 1, in accordance with an embodiment of the present invention, a schematic diagram is shown that depicts a HDD 102, which is an information-storage device that may be used for a computer system, and an example of a disk drive to which the embodiments of the present invention may be applied. The HDD 102 includes at least one magnetic-recording disk 106 as a disk for storing data within a base 104 of a disk enclosure (DE). The magnetic-recording disk 106 is affixed to a spindle motor 112 at the central portion and may be rotated by the spindle motor 112. An actuator 110 includes a plurality of parallel actuator arms 112 formed in a comb shape, and is rotatably mounted on the base 104 at a pivot assembly 114.

A magnetic-recording head, which includes a write element for writing data on the magnetic-recording disk 106 and a read element for reading data from the magnetic-recording disk 106, is mounted on a slider body section, so that the magnetic-recording head is integrated into the head-slider 118. The head-slider 118 is affixed to a flexure. The flexure is flexibly bonded to an end of a suspension 116. The suspension 116 is elastic, and applies a bias, which is a compressive pressing load, to the head-slider 118; and thus, presses the head-slider 118 in a direction towards the recording surface of the magnetic-recording disk 106 so that the head-slider 118 flies at an accurate distance from the recording surface of the magnetic-recording disk 106.

A voice coil motor (VCM) 120 rotates the actuator 110 so that the head-slider 118 disposed on a distal end of the suspension 116 is moved along path 124. Thus, a magnetic-recording head on the head-slider 118 is positioned on a designated data track from the inner circumference 126 to the outer circumference 128 of the magnetic-recording disk 106.

A lubricating film 122, for example, a perfluoropolyether (PFPE) film, is dip-coated onto a protective carbon thin film of the recording surface of the magnetic-recording disk 106 in order to protect the magnetic-recording disk 106 from wear and corrosion. The PFPE film may be selected from the group consisting of: "PFPE Z", "PFPE Zdol", "PFPE Z tetraol", "ZDMD (Z-dol multidentate)" and "ZTMD (Z-Tetraol multidentate)" being a multidentate lubricating oil.

The magnetic-recording disk 106 is rotated so that air is dragged onto the surface of the magnetic-recording disk 106. Since the flow way is narrowed in the space between the undersurface of the head-slider 118 and the surface of the magnetic-recording disk 106, the air is compressed in the space between the undersurface of the head-slider 118 and the surface of the magnetic-recording disk 106; and, consequently increased pressure is applied to the undersurface of the head-slider 118. Such pressure induces lift, which balances the load force provided by the suspension 116, so that the head-slider 118 is raised and allowed to fly in proximity with the recording surface of the magnetic-recording disk 106.

The air drawn by the rotation of the magnetic-recording disk 106 induces shearing stress on the lubricating film 122 on the surface of the magnetic-recording disk 106. Lubricant of the lubricating film 122 that becomes separated from the surface of the magnetic-recording disk 106 by the shearing stress forms droplets in the HDD 102. The droplets partially adhere to the undersurface of the head-slider 118.

Figure 2:
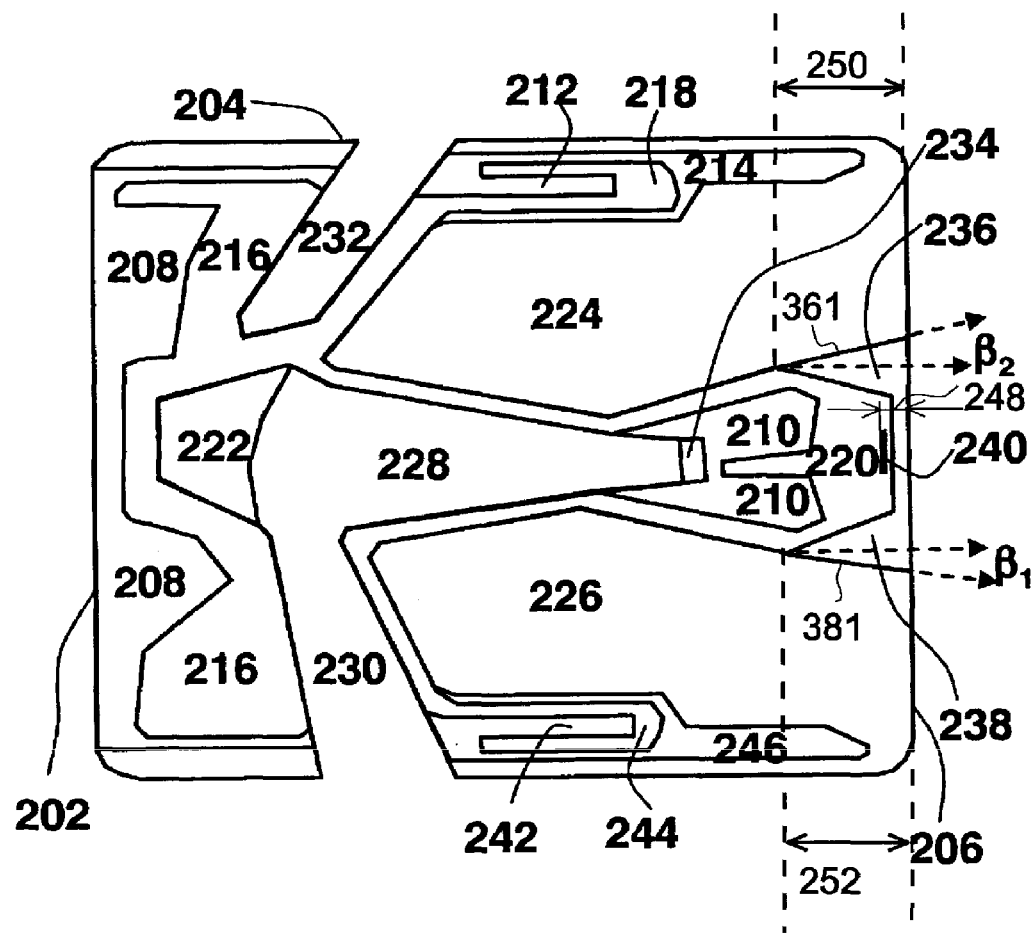
FIG. 2 is a plan view of an example of a head-slider, in accordance with an embodiment of the present invention.
Figure 3:
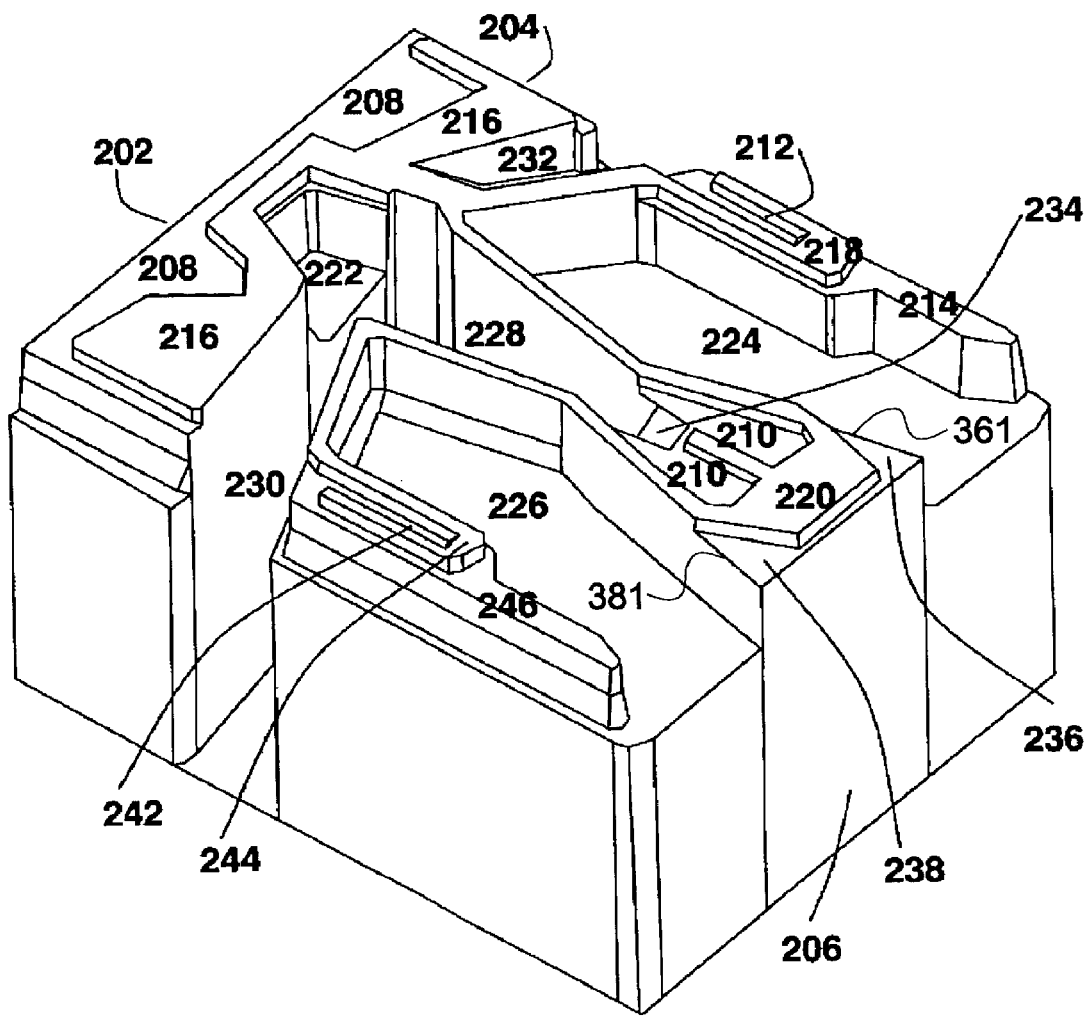
FIG. 3 is a perspective view of the example of the head-slider shown in FIG. 2, in accordance with an embodiment of the present invention.

With reference now to FIGS. 2 and 3, in accordance with embodiments of the present invention, a plan view is shown of an example of a magnetic-recording head-slider in FIG. 2; and, in FIG. 3, a perspective view is shown of FIG. 2. In an embodiment of the present invention, the head-slider 118 includes a leading edge 202, a trailing edge 206, and an ABS 204, which is a flight surface, of the head-slider 118.

The ABS 204 includes: an leading-edge step surface 208, which is a shallow recessed surface; an leading-edge rail 216; an trailing-edge rail 220; an trailing-edge step surface 210; an leading-edge negative-pressure recessed surface 222; two trailing-edge negative-pressure recessed surfaces 224 and 226; two side rails 218 and 244; side step surfaces 212 and 242; side step surfaces 214 and 246; a center channel 228; two side channels 230 and 232; and, two trailing-edge pads 236 and 238. The leading-edge step surface 208 has a larger width than the leading-edge rail 216. The channels 228, 230, and 232 are configured so that the change in the pressure on the ABS and the speed of the head-slider relative to the magnetic-recording disk will not significantly affect the fly height of the head-slider.

The leading-edge rail 216 includes a leading-edge rail face, which is a surface that faces the magnetic-recording disk. The trailing-edge rail 220 includes a trailing-edge rail face that faces the magnetic-recording disk, and further includes a magnetic-recording head 240 disposed in the trailing-edge rail face that faces the magnetic-recording disk. The trailing-edge negative-pressure recessed surfaces 224 and 226 are formed on the inner diameter side and the outer diameter side of the head-slider when disposed in proximity to the recording surface of the magnetic-recording disk 106, respectively.

The side rail 218 is disposed on the inner diameter side, and includes a rail face that faces the magnetic-recording disk. The side rail 244 is disposed on the outer diameter side, and includes a rail face that faces the magnetic-recording disk. On the inflow sides of the side rails 218 and 244, the side step surfaces 212 and 242, respectively, are disposed. On the outflow sides of the side rails 218 and 244, the side step surfaces 214 and 246, respectively, are disposed.

All of the surfaces of the leading-edge rail 216, the side rails 218 and 244, and the trailing-edge rail 220 are on the same plane, which is as high as the reference surface of the ABS 204. Air flowing between the head-slider 118 and the magnetic-recording disk 106 generates a fluid pressure which causes the head-slider 118 to fly in proximity with the recording surface of the magnetic-recording disk 106. At that time, the surfaces of the leading-edge rail 216, the side rails 218 and 244, and the trailing-edge rail 220 act as rail faces that generate positive pressure.

The leading-edge step surface 208, the side step surfaces 212 and 242, and the trailing-edge step surface 210 are at the same depth and are on the same plane, which are formed, respectively, at the inflow side of the leading-edge rail 216, at the inflow side of the side rails 218 and 244, and at an inflow side of the trailing-edge rail 220. Furthermore, the surfaces of the trailing-edge pads 236 and 238 disposed at the inner diameter side and at the outer diameter side of the trailing-edge rail 220 and the magnetic-recording head 240 are at the same depth as the above-described plurality of step surfaces. In accordance with embodiments of the present invention, the above-described structure of the ABS 204 increases manufacturing efficiency. The surfaces of the trailing-edge pads 236 and 238 may be at a different depth from those of the above-described plurality of step surfaces. In either case, in an embodiment of the present invention, the depth of the surfaces of the trailing-edge pads 236 and 238, which is the depth measured from the top surface of the trailing-edge rail 220, is 0.3 µm or less, or alternatively, 0.1 to 0.2 µm. This depth effectively suppresses the backflow of the air at the trailing edge to suppress the deposition of droplets.

Air flows from the leading edge 202 into a gap formed between the head-slider 118 and the magnetic-recording disk 106, and partially flows along the leading-edge step surface 208, the center channel 228, and the trailing-edge step surface 210. The air is compressed by the step surfaces, which are shallow recessed surfaces. The compressed air flows along the leading-edge rail 216 and the trailing-edge rail 220. Thus, positive pressure is generated on the surface of the leading-edge rail 216 and the surface of the trailing-edge rail 220. In an embodiment of the present invention, the length, which is the dimension in the direction of airflow that is the flying direction, of the trailing-edge step surface 210 for generating a sufficiently high positive pressure, which causes the head-slider to fly in proximity with the recording surface of the magnetic-recording disk 106, is 50 µm or more, or alternatively, 100 µm or more.

In one embodiment of the present invention, the width of the trailing-edge rail 220, which is the dimension in the disk radial direction, is small at the trailing edge. Specifically, the width of the trailing-edge rail 220 at the trailing edge is less than the width of the trailing-edge rail 220 at the trailing edge of the trailing-edge step surface 210. Furthermore, both sides of the trailing-edge rail 220 are tapered on the trailing-edge side and the width of the trailing-edge rail 220 gradually decreases from the inflow side toward the trailing edge. The decreased width of the trailing-edge rail 220 at the trailing edge allows the probability of contact of the trailing edge of the trailing-edge rail 220 with the magnetic-recording disk to be reduced when the spacing is reduced. In accordance with other embodiments of the present invention, depending on the design, both sides of the trailing-edge rail 220 may not be tapered.

At the downstream side of the trailing edge of the trailing-edge rail 220, a step surface is disposed, so that the trailing-edge rail 220 does not reach the trailing edge 206 of the head-slider 118. Particularly, in the configuration that a heater for TFC disposed at the magnetic-recording head thermally expands the periphery of the read element, or write element, so as to cause protrusion from the ABS 204, this shape prevents contact of the expanded surface of the trailing-edge rail 220 with the magnetic-recording disk.

At the inflow side of the trailing-edge rail 220, a protrusion is disposed to divide the trailing-edge step surface 210 into two portions at the middle. The surface of the protrusion is on the same plane as the surface of the trailing-edge rail 220. In this way, the inflow side of the trailing-edge rail 220 is formed with a W-shape, which provides a W-shaped trailing-edge rail 220. This shape reduces the pressure at magnetic-recording head 240, achieving efficient TFC of the head-slider 118 flying in proximity to the recording surface of the magnetic-recording disk 106.

The side step surfaces 212 and 242 at the inflow side are at the same depth and are on the same plane as the leading-edge step surface 208. Each inflow side of the rail surfaces of the side rails 218 and 244 is formed with a U-shape. A portion of the air flowing from the leading edge 202 into the gap formed between the head-slider 118 and the magnetic-recording disk 106 flows along the leading-edge step surface 208 and the side step surfaces 212 and 242 to be compressed. The pressure on each of the side rails 218 and 244 is increased, which produces a positive pressure, leading to increase in air stiffness in a roll direction.

The surface, which is the bottom, of the center channel 228 is disposed deeper than the surfaces, which are the bottom surfaces, of the negative-pressure recessed surfaces 222, 224 and 226. The center channel 228 is configured, or shaped, to allow the compressed air to flow along the surface of the trailing-edge rail 220 toward the trailing edge of the slider. The center channel 228 is formed from within proximity of the leading edge toward the magnetic-recording head 240. The center line in the longitudinal direction of the center channel 228 substantially agrees with the center of the magnetic-recording head 240.

Similarly, the surfaces of the two side channel 230 and 232 are disposed deeper than the surfaces of the negative-pressure recessed surfaces 222, 224, and 226 and at the same depth as the surface of the center channel 228. At least one side channel of the plurality of side channels 230 and 232, in the present example, the side channel 230, is open to the center channel 228. The plurality of side channels 230 and 232 are configured to allow the air to flow toward the side edges of the head-slider 118.

The depth of the negative-pressure recessed surfaces 222, 224 and 226 from the surface including the leading-edge step surface 208 is about 500 to 800 nanometers (nm). The depth of the negative-pressure recessed surfaces 222, 224, and 226 from the surface including the leading-edge rail 216 is about 600 to 1,000 nm. In an embodiment of the present invention, the head-slider is applied to a head-slider in so-called pico size, which is about 1250×1000×300 micrometers (μm), or femto size, which is about 850×700×230 μm, but may be applied to a head-slider in atto size, which is about 850×500× 180 μm. The head-slider may include ceramics, such as alumina, or an inter-metallic compound, such as titanium carbide.

In another embodiment of the present invention, the length 250 in the longitudinal direction of the trailing-edge pad 236 at the inner diameter side and the length 252 in the longitudinal direction of the trailing-edge pad 238 at the outer diameter side are each not less than twice of the length 248 from the trailing edge 206 of the head-slider to the leading-edge end, which is also referred to herein as the inflow-side end, of the magnetic-recording head 240. In accordance with embodiments of the present invention, the range of each of the length 250 and the length 252 is twice to three times the length 248. Thus, in accordance with embodiments of the present invention, this structure of the ABS 204 allows sufficient positive pressure to be generated to effectively prevent a backflow from the trailing edge 206.

Detailed descriptions are next given of the trailing-edge pads 236 and 238 on the head-slider 118. The flow pads 236 and 238 suppress the backflow occurring in the negative-pressure recessed surfaces 224 and 226 near the trailing-edge rail 220. The trailing-edge pads 236 and 238 allow the airflow along a skew angle to pass over the trailing-edge rail 220 and by side faces of the trailing-edge rail 220 to the trailing edge 206 to suppress backflow occurring near the trailing edge around, or in the vicinity of, the magnetic-recording head 240, which includes the read element and the write element, on the trailing-edge rail 220. The effects of the trailing-edge pads 236 and 238 may prevent the accumulation of the lubricating oil near the trailing-edge rail 220, and consequently high reliability may be obtained.

Figure 4:
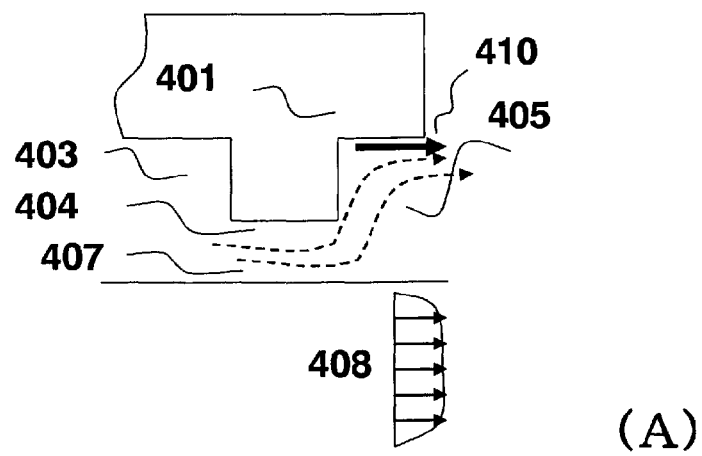
FIGS. 4(A), 4(B) and 4(C) are examples of airflows in the case where a recessed surface is disposed at the trailing edge of the head-slider, with relevance to embodiments of the present invention.
Figure 4:
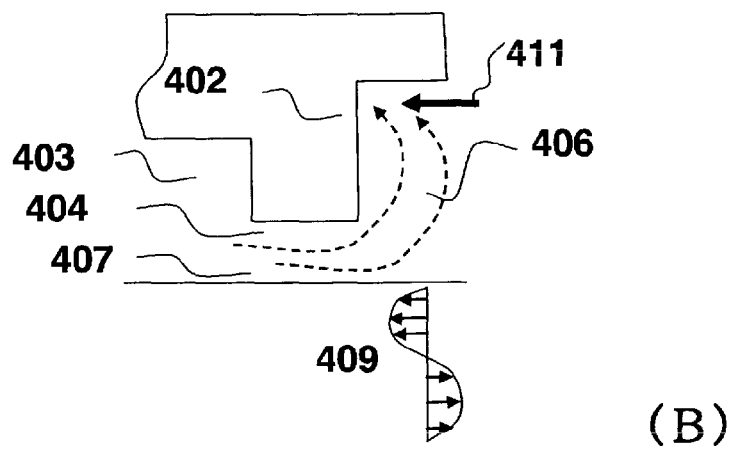
Figure 4:
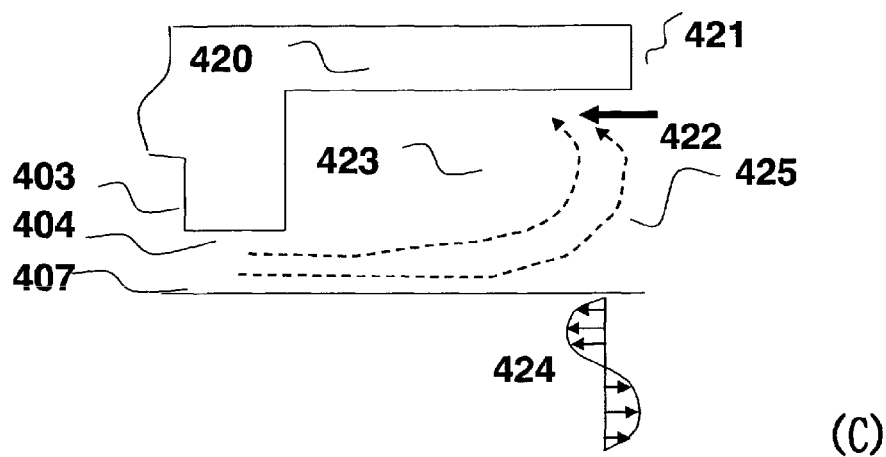

With reference now to FIGS. 4(A), 4(B) and 4(C), with relevance to embodiments of the present invention, air, a droplet, or a particle 407 is shown that flows from leading-edge step surfaces 403 of head-sliders 401, 402 and 420 to trailing-edge step surfaces 405, 406 and 425, respectively, over rail surfaces 404. In FIG. 4(A), since the step depth of the trailing edge step surface 405 from the rail surface 404 is not large, the flow velocity distribution in a height direction at the relevant position is the direction flowing downstream, in the direction of the trailing edge, or the outflow side, of the head-slider 401 as indicated by the arrows 408. Accordingly, a flow 410 flowing downstream exists even at a position on the trailing-edge step surface 405 and in the vicinity of the trailing-edge step surface 405; and therefore, the air, droplet, or particle 407 flows downstream.

On the other hand, in FIG. 4(B), since the step depth of the trailing-edge step surface 406 from the rail surface 404 is large, the flow velocity distribution in a height direction at the relevant position is indicated by the arrows 409. A backflow 411 exists on the trailing-edge step surface 406 and in the vicinity of the trailing-edge step surface 406. Consequently, the air, droplet, or particle is accumulated on the trailing-edge step surface 406.

In FIG. 4(C), the head-slider 420 has a relatively long negative-pressure region 423. The pressure on the trailing-edge step surface 425 is lower than the pressure at the trailing edge 421 of the head-slider, at which the pressure is equal to the ambient pressure, due to the effect of the negative-pressure region 423. Accordingly, a backflow 422 occurs near the boundary between the negative-pressure region 423 and the trailing-edge step surface 425; therefore, the air, droplet, or particle 407 cannot consequently flow by the trailing-edge; and thus, the air, droplet, or particle is accumulated.

With the structure of the ABS of a head-slider described with reference to FIGS. 5 and 6, backflow occurs around, or in the vicinity of, the trailing-edge rail of the magnetic-recording head 240. Thus, the phenomenon as described in the discussion of FIG. 4(B) or 4(C) occurs for the ABS designs of the conventional art shown in FIGS. 5 and 6. The stagnation lines 504 and 606, which lead toward the trailing-edge rail, reach the trailing-edge rail, so that droplets are accumulated on the trailing-edge rail; and furthermore, the droplets generated at the trailing edge are conveyed upstream along the trailing-edge rail to increase the amount of accumulated droplets.

However, in accordance with embodiments of the present invention, the trailing-edge pads 236 and 238 suppress backflow in the vicinity of the trailing-edge rail 220 to produce the condition in the airflow velocity distribution shown in FIG. 4(A) or a similar condition thereto. The trailing-edge pads 236 and 238 put away the stagnation lines which are generated in the negative-pressure recessed surfaces 224 and 226, which lead toward the trailing-edge rail 220, from the trailing-edge rail 220, and further prevent the droplets which may be generated at the trailing edge of the trailing-edge rail 220 from flowing upstream. Thus, in accordance with embodiments of the present invention, accumulation of droplets on the trailing-edge rail 220 may be suppressed.

With further reference to FIGS. 2 and 3, in accordance with embodiments of the present invention, the ABS 204 of the head-slider 118 includes an inner trailing-edge pad 236 on the right of the trailing-edge rail 220, which is at the outer diameter side, and an outer trailing-edge pad 238 on the left of the trailing-edge rail 220, which is at the inner diameter side. At the place between the two trailing-edge pads 236 and 238, the magnetic-recording head 240 is located. The surfaces, which are the pad faces, of the two trailing-edge pads 236 and 238 are located deeper than the rail face of the trailing-edge rail and shallower than the negative-pressure recessed surfaces 224 and 226. Moreover, in a structure of another embodiment of the present invention, the depth of the pad faces of the trailing-edge pads 236 and 238 is the same as that of the step surface 210, which suppresses an effect from the design of the ABS 204 on the flight of the head-slider 118.

The pad faces of the trailing-edge pads 236 and 238 are triangular-shaped and reach the trailing edge 206 of the head-slider 118. The inner side face of the inner trailing-edge pad 236 is flat and stands vertical from the inner negative-pressure recessed surface 224. The pad face of the inner trailing-edge pad 236 is perpendicular to the inner side face and includes a straight inner edge 361. The outer side face of the outer trailing-edge pad 238 is flat and stands vertical from the outer negative-pressure recessed surface 226. The pad face of the outer trailing-edge pad 238 is perpendicular to the outer side face and includes a straight outer edge 381. The two trailing-edge pads 236 and 238 do not reach the inner end and the outer end of the head-slider; and, the two negative-pressure recessed surfaces 224 and 226 reach the trailing edge.

As shown in FIG. 2, the inner edge 361 of the inner trailing-edge pad 236 is slanted inward, which is toward the inner diameter, in the direction from the inflow side toward the outflow side, wherein the angle relative to the center line which connects the center of the leading edge 202 of the head-slider 118 and the center of the trailing edge 206 is $\beta_2$. The outer edge 381 of the outer trailing-edge pad 238 is slanted outward, which is toward the inner diameter, in the direction from the inflow side toward the outflow side, wherein the angle relative to the above center line is $\beta_1$.

In accordance with embodiments of the present invention, the inventors have found through their research that the angles $\beta_2$ and $\beta_1$ be provided within an appropriate range for the trailing-edge pads 236 and 238 to suppress the backflow in the vicinity of the trailing-edge rail 220. Angles $\beta_2$ and $\beta_1$ outside of the appropriate range cannot eliminate the accumulation of droplets on the trailing-edge rail 220, or may affect the fly height of the head-slider 118.

To effectively suppress the accumulation of droplets on the trailing-edge rail 220, the appropriate angular range for the angles $\beta_2$ and $\beta_1$ is determined in accordance with the absolute value of the skew angle of the head-slider 118. In accordance with embodiments of the present invention, since the airflow changes depending on the skew angle of the head-slider, the angles $\beta_2$ and $\beta_1$ are determined by the skew angles at the innermost and the outermost data tracks. As described above and elsewhere described herein, the angles $\alpha_1$, $\alpha_2$, $\beta_1$, and $\beta_2$ refer to the positive definite magnitudes, which are the absolute values, of the angles described.

Figure 11:
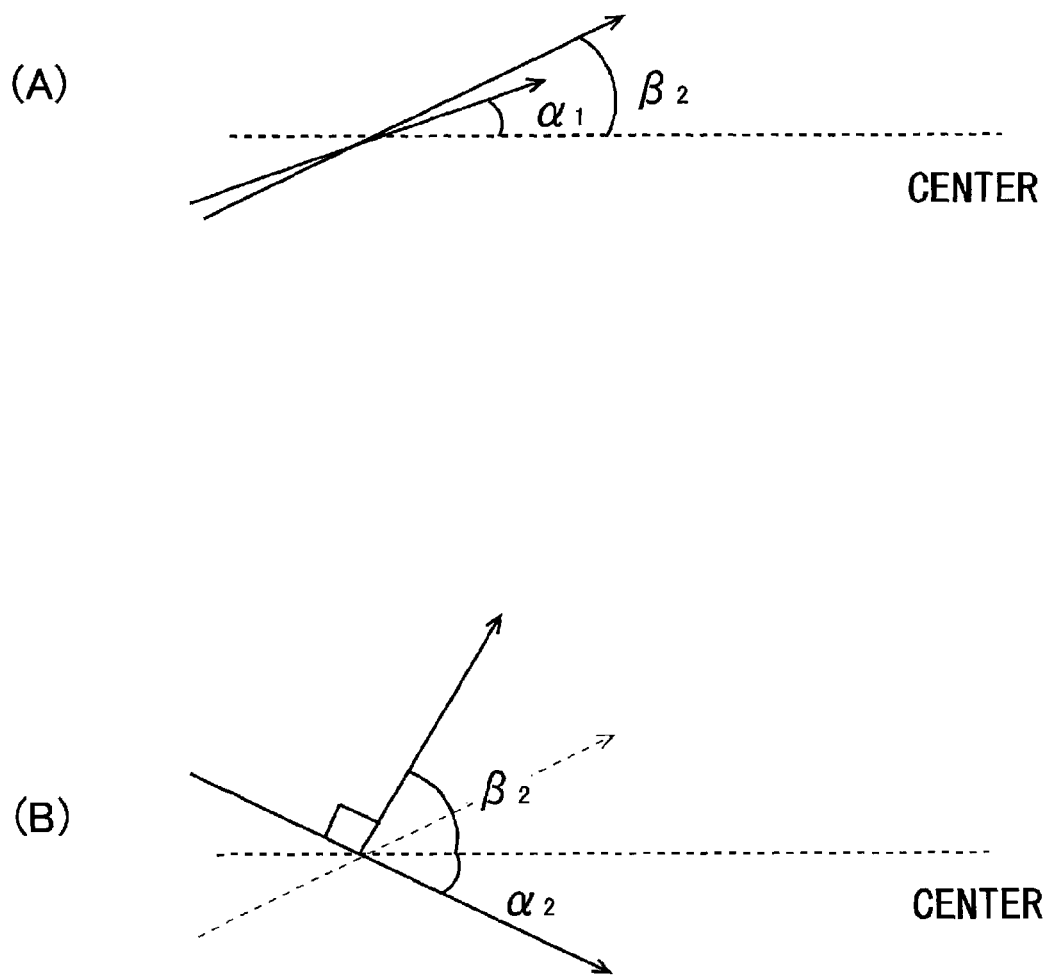
FIGS. 11(A) and 11(B) are diagrams illustrating the relationship between the pad angle of the inner trailing-edge pad and the absolute value of the skew angle at a position on the outermost data track, in accordance with an embodiment of the present invention.

With reference now to FIG. 11(A), in accordance with an embodiment of the present invention, a diagram is shown that illustrates the relationship between the angle $\beta_2$ and the skew angle $\alpha_1$. In accordance with embodiments of the present invention, the angle $\beta_2$ of the pad face of the inner trailing-edge pad 236 is not less than the absolute value $\alpha_1$ of the skew angle on the outermost data track of the magnetic-recording disk. The arrow defined by the absolute value $\alpha_1$ of the skew angle represents the direction of the airflow on the outermost data track. As illustrated in FIG. 11(A), the pad face of the inner trailing-edge pad 236 includes an inner edge having the angle $\beta_2$ relative to the longitudinal direction of the slider 118.

In the outer diameter area of the magnetic-recording disk 106, if the angle $\beta_2$ is not less than the absolute value of the skew angle at each radial position, the turbulence of the air passing above the pad 236 may be effectively suppressed so that the air flows downstream along the trailing-edge rail 220, as well as along the pad 236. If the angle $\beta_2$ is smaller relative to the skew angle, the air has difficulty flowing along the surface of the inner trailing-edge pad 236, which results in air turbulence. Then, droplets are likely to be accumulated on the trailing-edge rail 220. If the angle $\beta_2$ is provided so as to be not less than the absolute value $\alpha_1$ of the skew angle on the outermost data track, the angle $\beta_2$ of the pad face of the inner trailing-edge pad 236 may be not less than the absolute value of the skew angle at any position in the outer diameter area of the magnetic recording disk 106.

With reference now to FIG. 11(B), in accordance with an embodiment of the present invention, a diagram is shown that shows the state in which the sum of the angle $\beta_2$ and the absolute value $\alpha_2$ is 90°. In this instance, in accordance with embodiments of the present invention, the sum of the angle $\beta_2$ of the pad face of the inner trailing-edge pad 236 and the absolute value $\alpha_2$ of the skew angle on the innermost data track, which is given by the expression, $\alpha_2+\beta_2$, is 90° or less. At each radial position in the inner diameter area, if the angle $\beta_2$ is larger than the angle determined by the absolute value of the skew angle at the radial position and the above-described relationship obtains, droplets are likely to be accumulated along the inflow end of the inner trailing-edge pad 236. The upper limit of the angle $\beta_2$ determined by the absolute value $\alpha_2$ of the skew angle on the innermost data track may satisfy the above-described relationship between the angle $\beta_2$ and the skew angle at any position in the inner diameter area of the disk.

Figure 12:
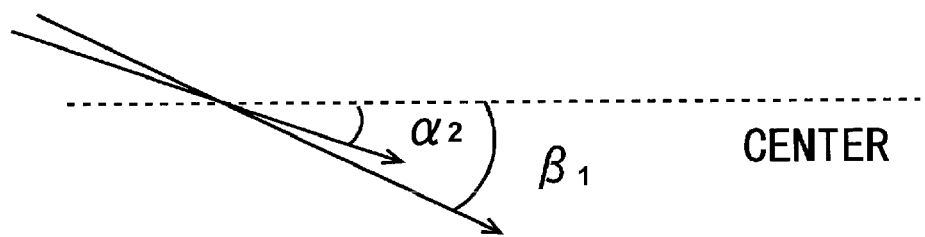
FIGS. 12(A) and 12(B) are diagrams illustrating the relationship between the pad angle of the outer trailing-edge pad and the absolute value of the skew angle at a position on the innermost data track, in accordance with an embodiment of the present invention.
Figure 12:
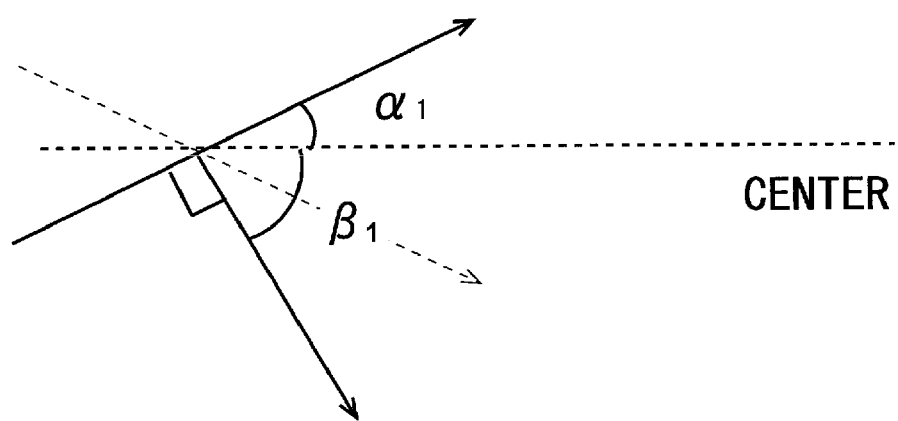

With reference now to FIG. 12(A), in accordance with an embodiment of the present invention, a diagram is shown that illustrates the relationship between the angle $\beta_1$ and the skew angle $\alpha_2$. The angle $\beta_1$ of the outer trailing-edge pad 238 is opposite to the angle $\beta_2$ of the inner trailing-edge pad 236. In other words, in accordance with embodiments of the present invention, the angle $\beta_1$ of the pad face of the outer trailing-edge pad 238 is not less than the absolute value $\alpha_2$ of the skew angle on the innermost data track of the magnetic-recording disk. The arrow defined by the absolute value $\alpha_2$ of the skew angle $\alpha_2$ represents the direction of the airflow on the innermost data track. As illustrated in FIG. 12(A), the pad face of the outer trailing-edge pad 238 includes an outer edge having the angle $\beta_1$ relative to the longitudinal direction of the slider 118.

In the inner diameter area of the magnetic-recording disk 106, if the angle $\beta_1$ is not less than the absolute value of the skew angle at each radial position, the turbulence of the air passing above the outer trailing-edge pad 238 may be effectively suppressed so that the air flows downstream along the trailing-edge rail 220, as well as along the pad 238. If the angle $\beta_1$ is smaller relative to the skew angle, the air has difficulty flowing along the surface of the outer trailing-edge pad 238, which results in air turbulence. Then, droplets are likely to be accumulated on the trailing-edge rail 220. If the angle $\beta_1$ is provided so as to be not less than the absolute value $\alpha_2$ of the skew angle on the innermost data track, the angle $\beta_1$ of the pad face of the outer trailing-edge pad 238 may be not less than the absolute value of the skew angle at any position in the inner diameter area of the disk.

With reference now to FIG. 12(B), in accordance with an embodiment of the present invention, a diagram is shown that shows the state in which the sum of the angle $\beta_1$ and the absolute value $\alpha_1$ is 90°. In this instance, in accordance with embodiments of the present invention, the sum of the angle $\beta_1$ of the outer trailing-edge pad 238 and the absolute value $\alpha_1$ of the skew angle on the outermost data track, which is given by the expression, $\alpha_1+\beta_1$, is 90° or less. At each radial position in the outer diameter area, if the angle $\beta_1$ is larger than the angle determined by the absolute value of the skew angle at the radial position and the above-described relationship obtains, droplets are likely to be accumulated along the inflow end of the outer trailing-edge pad 238. The upper limit of the angle $\beta_1$ determined by the absolute value $\alpha_1$ of the skew angle on the outermost data track may satisfy the above-described relationship between the angle $\beta_1$ and the skew angle at any position in the outer diameter area of the disk.

In the structure shown in FIGS. 2 and 3, the trailing-edge pads 236 and 238 have shapes symmetrical about a center line extending in the longitudinal direction of the head-slider 118. In other words, the pad faces of the trailing-edge pads 236 and 238 are disposed at the same depth and the inner edge 361 and the outer edge 381 have the same length and the same angle. Thus, in an embodiment of the present invention, the two trailing-edge pads 236 and 238 are symmetrical about the center line extending in the longitudinal direction of the head-slider 118, so that the effect of the two trailing-edge pads 236 and 238 on the design of the head-slider affecting the flight of the head-slider may be suppressed.

Figure 8:
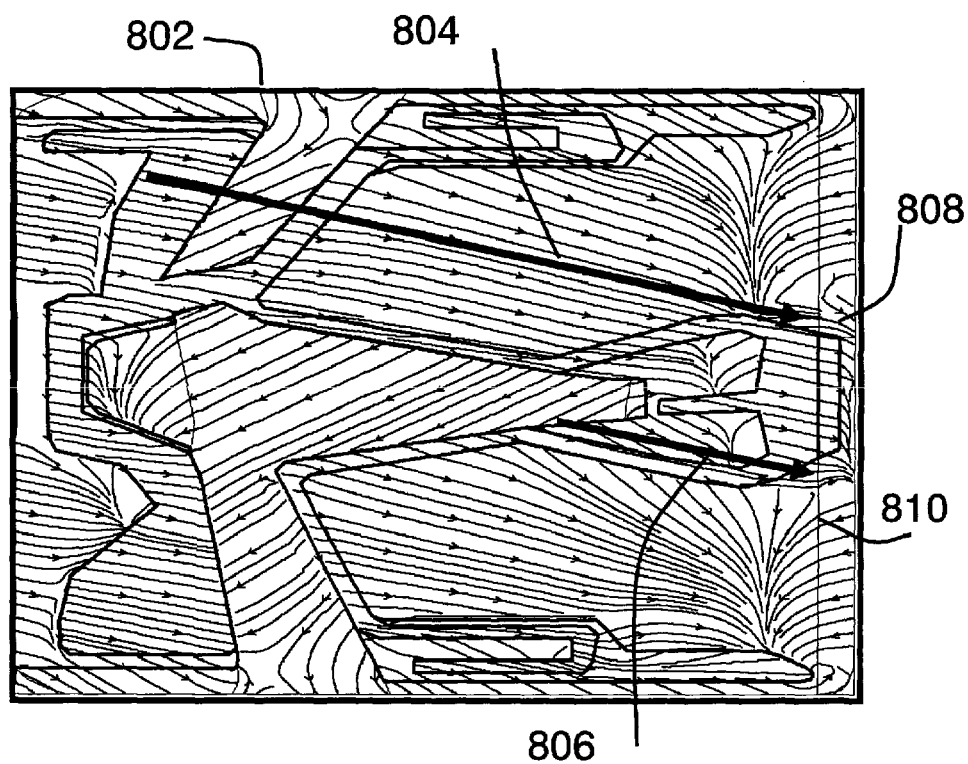
FIGS. 8(A) and 8(B) are example of airflows near the ABS of a head-slider when the head-slider flies in proximity to the recording surface of the magnetic-recording disk at a position in an inner diameter area of the rotated magnetic-recording disk, in accordance with an embodiment of the present invention.
Figure 8:
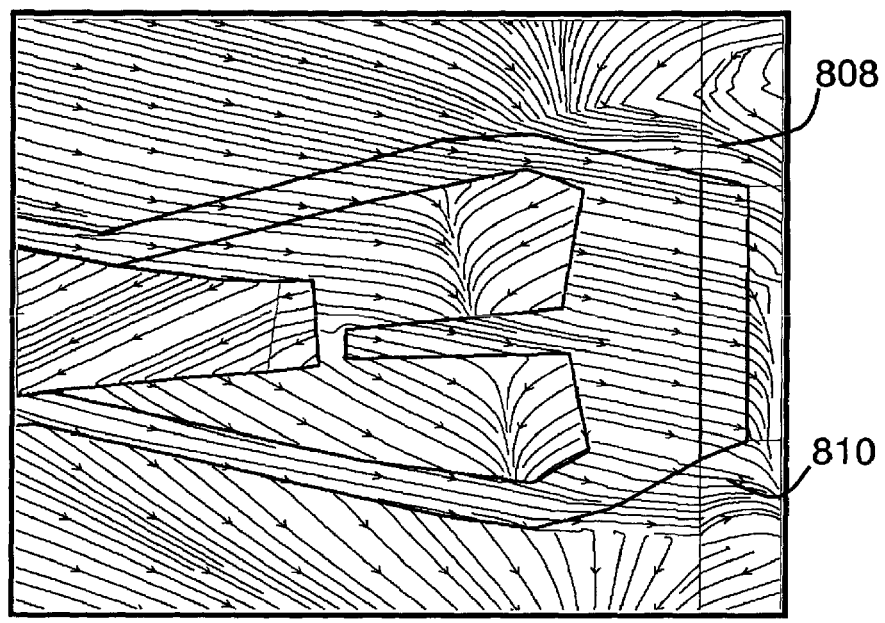

With reference now to FIGS. 8(A) and 8(B), in accordance with embodiments of the present invention, the result of simulation of air flowing near the ABS 204 of the head-slider is shown in the case where the head-slider flies in proximity with the recording surface of the magnetic-recording disk at the inner diameter area of a rotated disk. In FIG. 8(A), the reference numerals 808 and 810 indicate the airflows above the trailing-edge pads 236 and 238, respectively (referring to FIGS. 2 and 3), and the reference numerals 804 and 806 indicate the flowing direction toward or over the trailing-edge pads 236 and 238, respectively.

Figure 5:
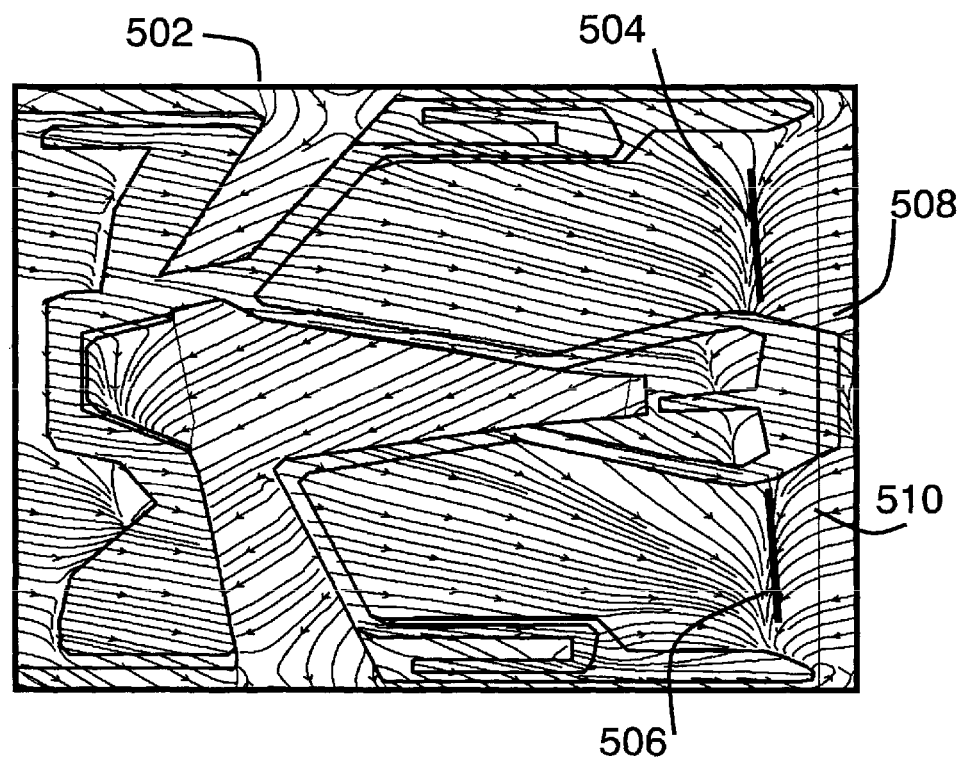
FIGS. 5(A) and 5(B) are examples of airflows near the air-bearing surface (ABS) of a conventional head-slider when the head-slider flies in proximity with a recording surface of a magnetic-recording disk at a position in an inner diameter area of the rotated magnetic-recording disk, in accordance with conventional art.
Figure 5:
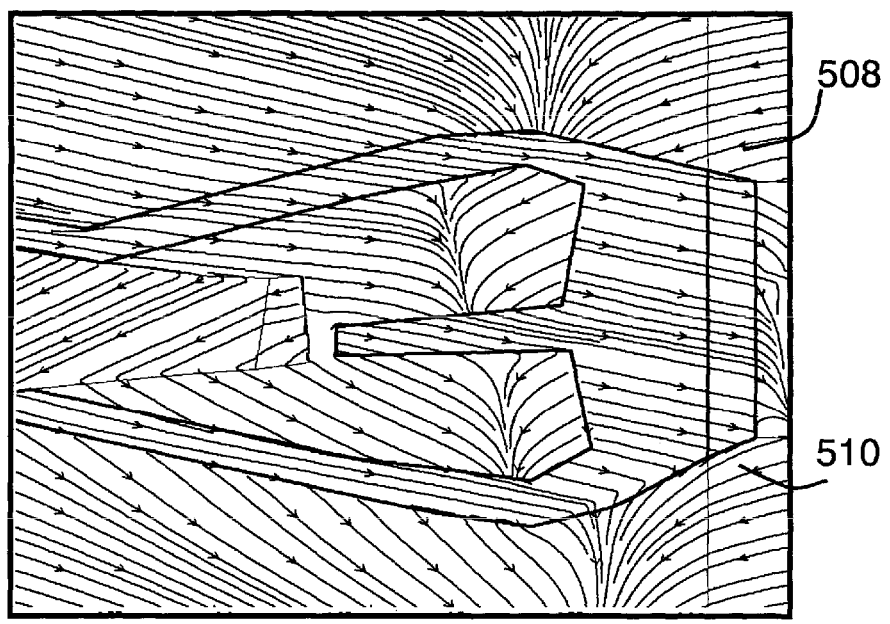
Figure 6:
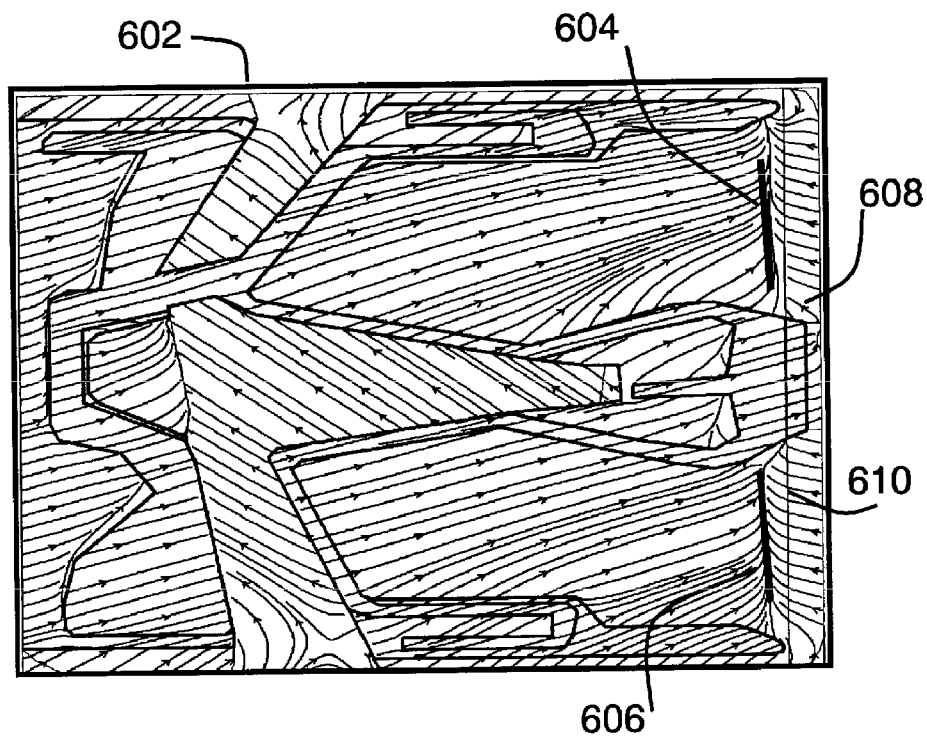
FIGS. 6(A) and 6(B) are examples of airflows near the ABS of a conventional head-slider when the head-slider flies in proximity to a recording surface of the magnetic-recording disk at a position in an outer diameter area of the rotated magnetic-recording disk, in accordance with conventional art.
Figure 6:
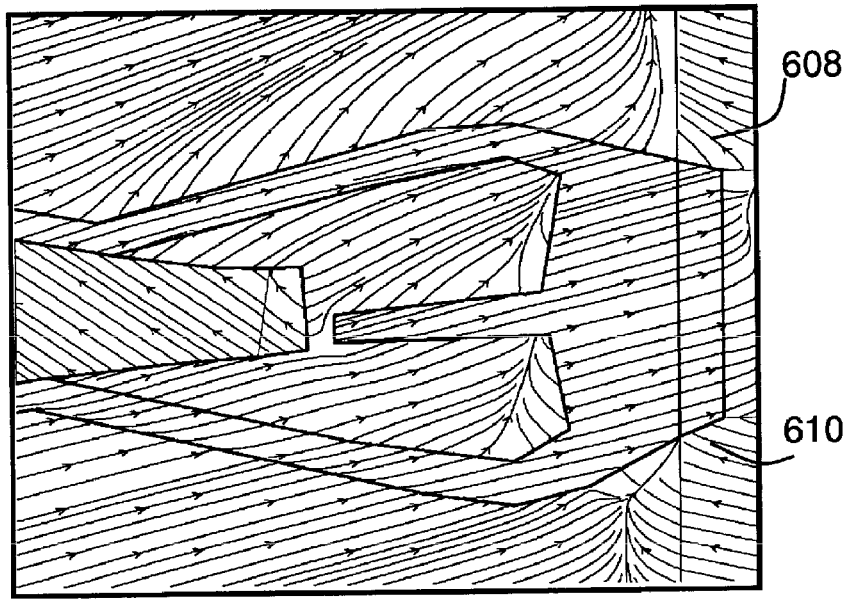

Compared with the simulation result shown in FIG. 5, the places, which are located at the stagnation lines, where the downflows and the backflows of air meet within the negative-pressure recessed surfaces 224 and 226 to provide the flow velocity of zero (referring to FIGS. 2 and 3) are shifted toward the inner diameter end and the outer diameter end by the effect of the trailing-edge pads 236 and 238, respectively. There is no backflow occurring near the trailing-edge rail 220, and the flow along the skew angle flows downstream along the trailing-edge rail 220. This eliminates the phenomenon that lubricant adheres around the trailing-edge rail surface 220. Thus, in an embodiment of the present invention, the accumulation of the lubricant is reduced on the relevant portions of the negative-pressure recessed surfaces 224 and 226.

In FIG. 8(B), the reference numerals 808 and 810 indicate, by way of example, the airflows near the trailing edge around the magnetic-recording head 240. FIG. 8(B) shows that the two trailing-edge pads 236 and 238 at the respective sides of the trailing-edge rail 220 have been fabricated so that a backflow does not occur above the trailing-edge pads. Accordingly, the lubricant adhering to the trailing-edge rail 220 is dispersed from the trailing edge of the head-slider downstream without being accumulated at the trailing edge of the head-slider. Therefore, a read error or a write error caused by falling of a droplet from the magnetic-recording head 240 onto the magnetic-recording disk may be prevented.

Figure 9:
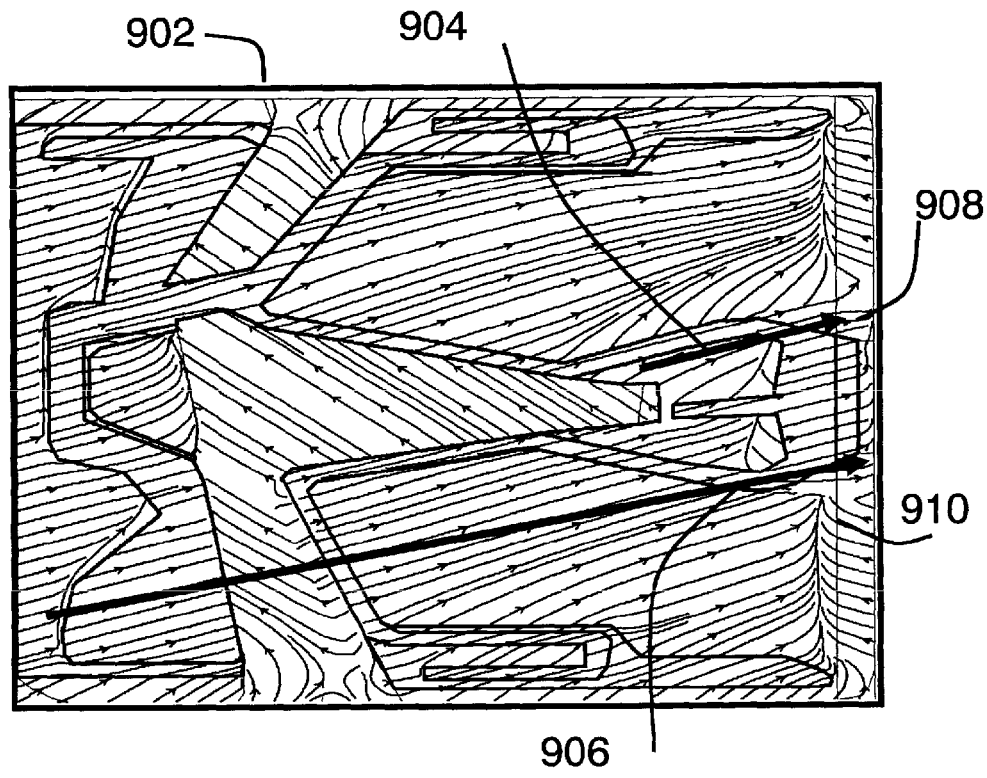
FIGS. 9(A) and 9(B) are example of airflows near the ABS of a head-slider when the head-slider flies in proximity to the recording surface of the magnetic-recording disk at a position in an outer diameter area of the rotated magnetic-recording disk, in accordance with an embodiment of the present invention.
Figure 9:
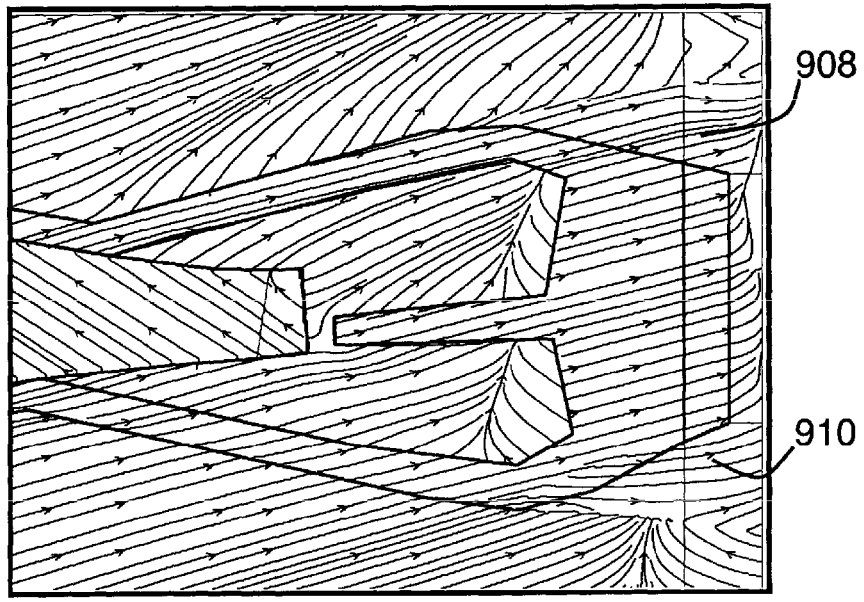

With reference now to FIGS. 9(A) and 9(B), in accordance with embodiments of the present invention, the result of simulation of the air flowing near the ABS 204 of the head-slider is shown in the case where the head-slider flies in proximity with the recording surface of the magnetic-recording disk at the outer diameter area of a rotated disk. In FIG. 9(A), the reference numerals 908 and 910 indicate the airflows above the trailing-edge pads 236 and 238, respectively, and the reference numerals 904 and 906 indicate the flowing direction toward or over the trailing-edge pads 236 and 238, respectively.

Compared with the simulation result shown in FIG. 5, the places, which are located at the stagnation lines, where the downflows and the backflows of air meet within the negative-pressure recessed surfaces 224 and 226 to provide the flow velocity of zero are shifted toward the inner diameter end and the outer diameter end by the effect of the trailing-edge pads 236 and 238, respectively. There is no backflow occurring near the trailing-edge rail 220, and the flow along the skew angle flows downstream along the trailing-edge rail 220. This eliminates the phenomenon that a lubricant adheres around the trailing-edge rail surface 220. Thus, in an embodiment of the present invention, the accumulation of the lubricant is reduced on the relevant portions.

In FIG. 9(B), the reference numerals 908 and 910 indicate, by way of example, the airflows near the trailing edge around the magnetic-recording head 240. FIG. 9(B) shows that the two trailing-edge pads 236 and 238 at respective sides of the trailing-edge rail 220 have been fabricated so that a backflow does not occur above the trailing-edge pads. Accordingly, the lubricant adhering to the trailing-edge rail 220 is dispersed from the trailing edge of the head-slider downstream without being accumulated at the trailing edge of the head-slider. Therefore, a read error or a write error caused by falling of a droplet from the magnetic-recording head 240 onto the magnetic-recording disk may be prevented.

In this way, the trailing-edge pads 236 and 238 suppress adhesion of droplets, which leads to suppression of fly-height loss. The angles $\beta_1$ and $\beta_2$ of the two trailing-edge pads 236 and 238 affect the pressure on the ABS 204. Accordingly, for pressure change on the ABS 204 caused by the changes of the angles and change in fly height caused by the pressure change, in another embodiment of the present invention, the angles are set within an appropriate range.

Figure 7:
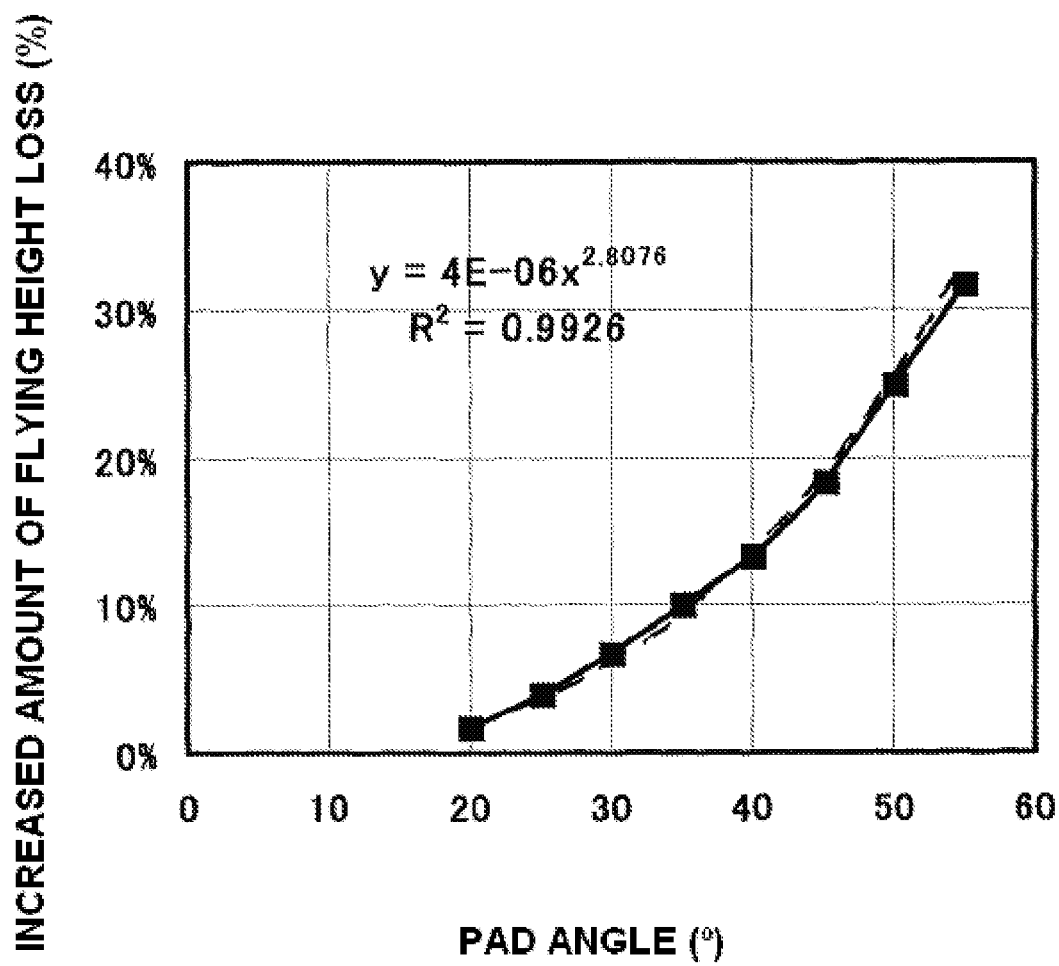
FIG. 7 is a plot showing the relationship between the pad angle and increased maximum fly-height loss percentage at a 3000 meter (m) altitude level, in accordance with an embodiment of the present invention.

With reference now to FIG. 7, in accordance with an embodiment of the present invention, a plot is shown that shows measurement results indicative of the relationship between the trailing-edge pad angle and the increased amount of the fly-height loss at a 3,000 m altitude level. The increased amount of the fly-height loss R is equal to (h−h0)/h0. Wherein, h0 represents the fly-height loss, which is a reduction in fly height, at the 3,000 m altitude level with a head-slider in an original design having no trailing-edge pads 236 or 238, and h represents the fly-height loss with a head-slider in the design having the trailing-edge pads 236 and 238 of the present example. Hence, the increased amount of the fly-height loss R indicates the percentage (%) of the increased amount of the fly-height loss of the head-slider having the trailing-edge pads 236 and 238 of the present example to the fly-height loss at the 3,000 m altitude level with a head-slider in the original design.

As shown in FIG. 7, the increased amount of the fly-height loss R at the 3,000 m altitude level increases with increase in the pad angle. When the relationship between the pad angle and the increased amount of the fly-height loss R at the 3,000 m altitude level is obtained, the following expression is given:

$$R = 4E{-}06\beta^{2.8076}. \qquad \text{(Expression 1)}$$

If the angles $\beta_1$ and $\beta_2$ of the trailing-edge pads 236 and 238 are too large, the fly-height loss at high altitude increases, and is likely to cause the side edges to make contact with the magnetic-recording disk. In this regard, in designing a head-slider, as long as the increased amount of the fly-height loss is less than 10%, sufficient fly-height characteristics may be obtained even if manufacturing variations are considered. Accordingly, in another embodiment of the present invention, in a head-slider having the trailing-edge pads 236 and 238, the pad angles $\beta_1$ and $\beta_2$ are 35° or less.

Figure 10:
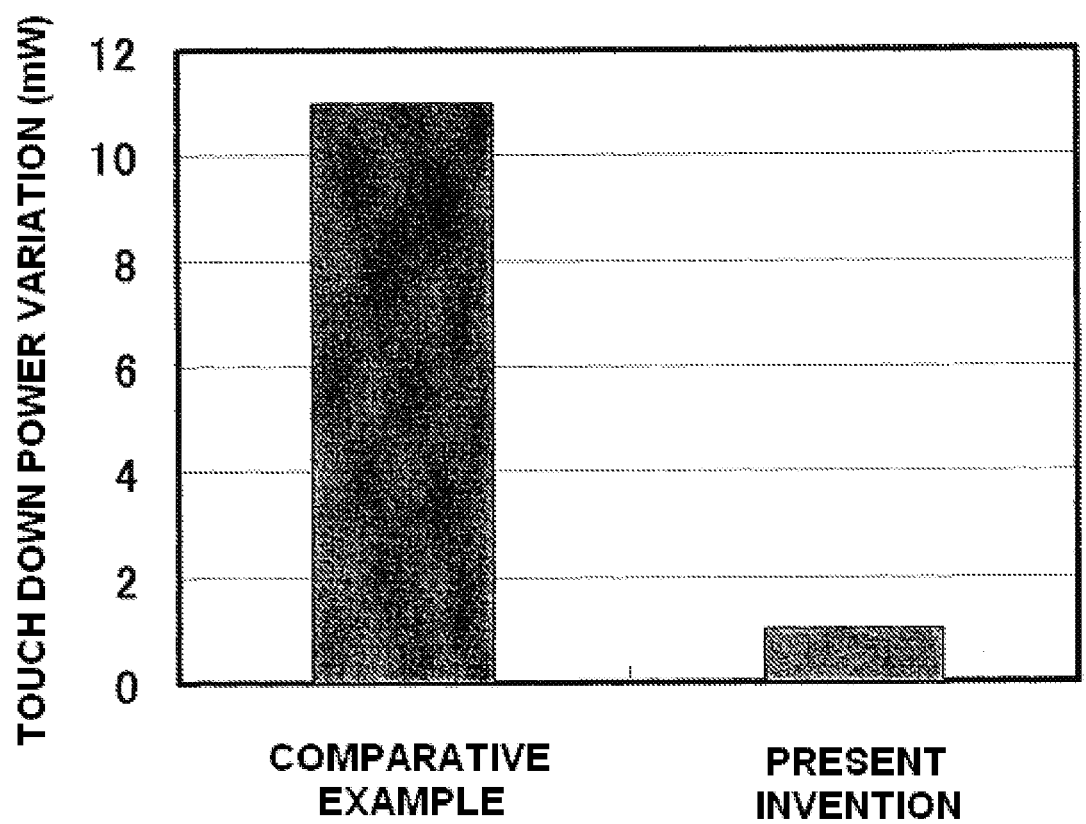
FIG. 10 is chart comparing an example experimental result of the touch down power variation in heaters, in accordance with an embodiment of the present invention, with an example experimental result of the touch down power variation in heaters, in accordance with conventional art, between an initial contact and a second contact after flying for one hour.

With reference now to FIG. 10, in accordance with embodiments of the present invention, the measurement result of the power variation, which is associated with the touch down power, of the heater for TFC is shown when the head-slider makes contact with the magnetic-recording disk. The touch down power variation indicates the variation between the initial contact and a second contact after flying for one hour. In FIG. 10, the measurement result with a conventional head-slider without trailing-edge pads is shown as a comparative example, in addition to the measurement result with a head-slider with trailing-edge pads, according to embodiments of the present invention. The touch down power increases with accumulation of the lubricant on the ABS of the head-slider. As understood from FIG. 10, the increase in the touch down power of the head-slider of the present example is small, which means a low lubricant accumulation on the ABS compared with the conventional head-slider.

As set forth above, embodiments of the present invention have been described by way of examples; but, embodiments of the present invention are not limited to the above-described examples. The above-described examples may easily be modified, added to, and each element of the above-described examples converted within the spirit and scope of embodiments of the present invention. For example, embodiments of the present invention may be applicable not only to an HDD, but also to a disk drive using other kinds of information-storage disks.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a disk configured to rotate; and
   a head-slider configured to fly in proximity with a recording surface of said disk, said head-slider comprising:
      an air-bearing surface configured to face said disk, said air-bearing surface comprising:
         a trailing-edge rail surface in which a magnetic-recording head is disposed, said magnetic-recording head comprising:
            a read element configured to read data from said disk, and
            a write element configured to write data to said disk;
         an inner negative-pressure recessed surface formed at an inner diameter side of said trailing-edge rail surface;
         an outer negative-pressure recessed surface formed at an outer diameter side of said trailing-edge rail surface;
         an inner trailing-edge pad that is disposed between said trailing-edge rail surface and said inner negative-pressure recessed surface, said inner trailing-edge pad comprising:
            a pad face deeper than said trailing-edge rail surface and shallower than said inner negative-pressure recessed surface; and
         an outer trailing-edge pad that is disposed between said trailing-edge rail surface and said outer negative-pressure recessed surface, said outer trailing-edge pad comprising:
            a pad face deeper than said trailing-edge rail surface and shallower than said outer negative-pressure recessed surface,
      wherein said pad surface of said outer trailing-edge pad further comprises a straight outer edge slanting outward in said direction from an inflow side toward an outflow side and said angle of said outer edge with respect to said longitudinal direction of said head-slider is $\beta_1$;
      wherein said pad surface of said inner trailing-edge pad further comprises a straight inner edge slanting inward in said direction from an inflow side toward an outflow side and said angle of said inner edge with respect to said longitudinal direction of said head-slider is $\beta_2$; and
      wherein, for absolute values of skew angles at an outermost data track position and an innermost data track position on said disk that are denoted by $\alpha_1$ and $\alpha_2$, respectively, following conditions are satisfied:

$$\alpha_2 \leq \beta_1, \alpha_1 + \beta_1 \leq 90°, \text{ and}$$

$$\alpha_1 \leq \beta_2, \alpha_2 + \beta_2 \leq 90°.$$

2. The disk drive of claim 1, wherein $\beta_1$ and $\beta_2$ are equal in magnitude, and said pad face of said inner trailing-edge pad and said pad face of said outer trailing-edge pad are disposed at a same depth.

3. The disk drive of claim 1, wherein $\beta_1$ and $\beta_2$ satisfy following conditions:

$$\beta_1 \leq 35°, \text{ and } \beta_2 \leq 35°.$$

4. The disk drive of claim 1, wherein a length of said inner trailing-edge pad in said longitudinal direction of said head-slider is not less than twice a length from said trailing edge of said head-slider to said leading edge of said magnetic-recording head; and
   wherein a length of said outer trailing-edge pad in said longitudinal direction of said head-slider is not less than twice said length from said trailing edge of said head-slider to said leading edge of said magnetic-recording head.

5. The disk drive of claim 1, wherein said air-bearing surface further comprises a step surface deeper than said trailing-edge rail surface at an inflow side of said trailing-edge rail surface.

6. The disk drive of claim 5, wherein said pad surface of said inner trailing-edge pad and said pad face of said outer trailing-edge pad are disposed at a same depth that is equal to a depth of said step surface.

7. The disk drive of claim 1, wherein depths of said inner trailing-edge pad surface and said outer trailing-edge pad surfaces are 0.3 μm or less.

8. The disk drive of claim 1, wherein said air-bearing surface further comprises two side rail surfaces.

9. The disk drive of claim 8, wherein each inflow side of said two side rail surfaces is formed in a U-shape.

10. The disk drive of claim 1, wherein said air-bearing surface further comprises a step surface deeper than said trailing-edge rail surface and shallower than said inner and outer negative-pressure recessed surfaces at an inflow side of said trailing-edge rail surface; and
    wherein said air-bearing surface further comprises a protrusion protruding from an inflow side of said trailing-edge rail surface for dividing said step surface.

11. The disk drive of claim 1, wherein said air-bearing surface further comprises a step surface deeper than said trailing-edge rail surface and shallower than said inner and outer negative-pressure recessed surfaces at an inflow side of said trailing-edge rail surface; and wherein a width of said trailing-edge rail surface at said trailing edge is less than a width of said step surface at said trailing edge of said step surface.

12. The disk drive of claim 1, wherein said air-bearing surface further comprises a center channel and a plurality of side channels that are deeper than said negative-pressure recessed surface.

13. The disk drive of claim 12, wherein at least one of said plurality of side channels is open to said center channel.

* * * * *